(12) United States Patent
Donovan et al.

(10) Patent No.: US 6,453,158 B2
(45) Date of Patent: *Sep. 17, 2002

(54) WIRELESS PREPAID PLATFORM INTEGRATION WITH STANDARD SIGNALING

(75) Inventors: Steven Donovan, Plano; Kathleen McMurry, Arlington; Raghavan Devanathan; John Kenneth Gallant, both of Plano, all of TX (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 23 days.

This patent is subject to a terminal disclaimer.

(21) Appl. No.: 09/427,239

(22) Filed: Oct. 26, 1999

Related U.S. Application Data

(62) Division of application No. 08/935,821, filed on Sep. 23, 1997.

(51) Int. Cl.⁷ .................... H04M 11/00; H04M 15/00
(52) U.S. Cl. ................. 455/406; 455/408; 455/409; 379/114.28
(58) Field of Search ...................... 455/414, 445, 455/406, 433, 432, 405, 408; 379/114.2, 114.29, 114.27, 114.28, 115.01, 126, 221.1, 127.03, 121.03, 221.08

(56) References Cited

U.S. PATENT DOCUMENTS

| | | | |
|---|---|---|---|
| 4,232,199 A | | 11/1980 | Boatwright et al. |
| 4,577,061 A | | 3/1986 | Katzeff et al. |
| 4,611,096 A | | 9/1986 | Asmuth et al. |
| 4,625,081 A | | 11/1986 | Lotito et al. |
| 4,685,127 A | | 8/1987 | Miller et al. |
| 4,706,275 A | | 11/1987 | Kamil |
| 4,782,519 A | | 11/1988 | Patel et al. |
| 4,791,640 A | | 12/1988 | Sand |
| 4,893,330 A | | 1/1990 | Franco |
| 5,068,891 A | | 11/1991 | Marshall |
| 5,195,086 A | | 3/1993 | Baumgartner et al. |
| 5,222,120 A | | 6/1993 | McLeod et al. |
| 5,377,186 A | * | 12/1994 | Wegner et al. .............. 370/220 |
| 5,386,467 A | * | 1/1995 | Ahmad |
| 5,452,350 A | | 9/1995 | Reynolds et al. |

(List continued on next page.)

*Primary Examiner*—Vivian Chin
*Assistant Examiner*—Charles N. Appiah

(57) ABSTRACT

The telecommunications networks of the present invention include a wireless enhanced service platform which is coupled to a home location register database and a prepaid platform. The telecommunications networks of the present invention may also include a mobile switching center for accepting calls from a wireless handset, an interexchange network that carries calls to the prepaid platform, and a local network for terminating calls.

The present invention also includes a method for setting up a call in a telecommunications network comprising sending transaction capabilities application part messages containing prepaid parameters between a wireless enhanced service platform and a prepaid platform. The prepaid parameters are the information needed to process and bill a debit call. The present invention also includes a method for sending transaction capabilities application part messages containing prepaid parameters between a mobile switching center and a prepaid platform.

17 Claims, 6 Drawing Sheets

U.S. PATENT DOCUMENTS

| | | | | |
|---|---|---|---|---|
| 5,504,804 A | * | 4/1996 | Widmark | 455/433 |
| 5,537,594 A | * | 7/1996 | Shannon et al. | 709/300 |
| 5,572,579 A | * | 11/1996 | Orriss et al. | 379/142 |
| 5,579,371 A | | 11/1996 | Aridas et al. | |
| 5,583,916 A | | 12/1996 | Maenpaa | |
| 5,590,181 A | | 12/1996 | Hogan et al. | |
| 5,621,787 A | * | 4/1997 | McKoy et al. | 379/144 |
| 5,712,908 A | * | 1/1998 | Brinkman et al. | 379/114.04 |
| 5,754,634 A | * | 5/1998 | Kay et al. | 379/134 |
| 5,778,313 A | * | 7/1998 | Fougnies | 455/406 |
| 5,797,096 A | * | 8/1998 | Lupien | 455/433 |
| 5,815,810 A | * | 9/1998 | Gallant | 455/433 |
| 5,875,238 A | * | 2/1999 | Glitho et al. | 379/114.01 |
| 5,907,802 A | * | 5/1999 | Scott | 455/406 |
| 5,909,485 A | * | 6/1999 | Martin et al. | 379/144 |
| 5,912,954 A | * | 6/1999 | Whited et al. | 379/114.29 |
| 5,987,068 A | * | 11/1999 | Cassia et al. | 455/102 |
| 6,021,189 A | * | 2/2000 | Vu | 379/144 |
| 6,035,025 A | * | 3/2000 | Hanson | 379/144 |
| 6,047,179 A | * | 4/2000 | Kirby | 455/432 |
| 6,058,300 A | * | 5/2000 | Hanson | 455/406 |
| 6,075,982 A | * | 6/2000 | Donovan et al. | 455/406 |
| 6,195,422 B1 | * | 2/2001 | Jones et al. | 379/114.01 |
| 6,195,543 B1 | * | 2/2001 | Granberg | 455/407 |

* cited by examiner

WIRELESS PREPAID PLATFORM INTEGRATION WITH STANDARD SIGNALING

CROSS REFERENCE TO RELATED APPLICATIONS

This application is a divisional of U.S. patent application Ser. No. 08/935,821 filed Sep. 23, 1997.

The following application of common assignee contains some common disclosure, and is believed to have an effective filing date identical with that of the present invention.

A WIRELESS PREPAID PLATFORM INTEGRATION WITH SS7 ISUP INTERFACE, incorporated herein by reference in its entirety.

BACKGROUND OF THE INVENTION

1. Field of the Invention

The present invention relates generally to telecommunications network products and, more particularly, to a method for processing wireless prepaid telephone calls.

2. Related Art

Telecommunications network products are services provided by telephone companies that are carried on telecommunications networks. A widely known example is dial-1 long-distance voice service which allows a customer to dial a 1 plus a ten digit number from his or her home telephone, talk to a party who answers the telephone on the line of the ten digit number dialed, and pay for the telephone call when billed at the end of the month. Although dial-1 is popular, other calling and payment options are sometimes preferable, such as the option to make a call from a phone other than the home phone and charge the call to the home phone account using a calling card.

One such calling and payment option is debit calling which is also referred to as prepaid calling. Debit calling allows a customer to put funds in an account and have those funds debited each time a telephone call is made. Standard debit call processing includes verification of the account balance prior to connecting the call and ongoing balance verification during the call. An example of a typical debit calling customer is a parent who purchases a debit calling card for a child away from home.

As previously mentioned, debit calling is carried on a telecommunications network. A telecommunications network comprises two basic elements: telecommunications equipment, which may also be referred to as network components, and links which connect the equipment or components. In a common channel signaling telecommunications network, two types of links connect components, signaling links and traffic links (also known as telephone lines). Signaling links carry signaling information needed to process a call between network components. Traffic links or telephone lines carry information a customer is sending, for example a digitalized signal of a person's voice, between network components. Components of the telecommunications network, specifically switches, establish a traffic link to carry a call by exchanging messages via signaling links. Signaling messages specify tasks to be performed on the traffic links.

Because call handling and information processing for debit calling differs from other voice services, debit calls are handled by specialized components in the telecommunications network. Difficulties arise in setting up calls through network components that are not specialized for handling prepaid calls. These components may handle primarily dial-1 calls or be specialized for another service such as wireless voice service. A particular problem addressed by the present invention is incorporating prepaid calls into a network specialized in handling wireless calls.

The most common approach in incorporating debit calling into a wireless network is to require a specialized wireless handset to force calls through to the network components that can handle the debit calls. Another approach is to require a customer to dial an access number to access the appropriate network components for debit calling. Yet another approach is to limit the services available to a debit caller, for example, some wireless debit services allow customers to make debit calls but do not allow customers to receive debit calls via the wireless network.

SUMMARY OF THE INVENTION

Briefly stated, the present invention offers wireless prepaid calling without the use of a special wireless handset or access number. In addition, the present invention allows a customer to place and receive calls via the wireless network. Also, the present invention offers specialized call processing for wireless debit calls while complying with industry signaling standards.

More particularly, the present invention is directed to a wireless prepaid platform using a signaling technique. The signaling technique involves use of a signaling message, referred to as a transaction capabilities application part message, between components to transfer information needed to process prepaid wireless calls. In addition, a prepaid routing number and a call identification number are used to route the call and retrieve information concerning the call.

The telecommunications industry has developed a standard signaling method which allows telephone companies to communicate over the networks of other companies. The equipment in a telecommunications network complies with the standard so it can receive and respond to signaling messages from other equipment. The current industry standard is American National Standards Institute (ANSI) Signaling System Number 7 (SS7) Integrated Services Digital Network (ISDN) User Part (ISUP), NCT 1.113 (1995) document and the American National Standards Institute (ANSI) Signaling System Number 7 (SS7) Message Transfer Part (MTP) NCT 1.111 (1992) document which are incorporated herein by reference in their entirety. The industry standard signaling messaging used for call set-up is referred to as the initial address message.

In addition to the initial address message, the present invention uses a transaction capabilities application part message, also which also complies with the American National Standards Institute (ANSI) Signaling System Number 7 (SS7) Integrated Digital Network (ISDN) User Part (ISUP) standard, to transfer information needed to process prepaid wireless calls. The transaction capabilities application part message comprises a transaction portion and a component portion. The transaction portion indicates the type of message and elements in the network that will receive the message. The component portion includes a query or invoke message and a response message. The query or invoke message includes the operation to be performed and parameters that can be defined on a product-by-product basis. The response component indicates whether the transaction was successful, contained an error, or was rejected.

Although the format for a transaction capabilities application message complies with the industry standard signaling method, the industry standard signaling method does not specify that this message be used to signal for prepaid wireless call processing. In addition, the signaling technique of the present invention defines parameters in the query or invoke component of the message to provide information that can be used for routing and billing of prepaid wireless calls.

Although the industry signaling standard does not specify the use of a transaction capabilities message or the prepaid parameters for prepaid wireless call processing, because the information is translated by the equipment into a form that can be transmitted by an initial address message, the call set-up signaling technique complies with the industry standard signaling method.

Use of the signaling technique alleviates the need for a special wireless handset or access number to direct the call to the appropriate network components. Also, services are not limited, for example, a prepaid subscriber may both make and receive a call.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Structure of the Invention

Figure 1:
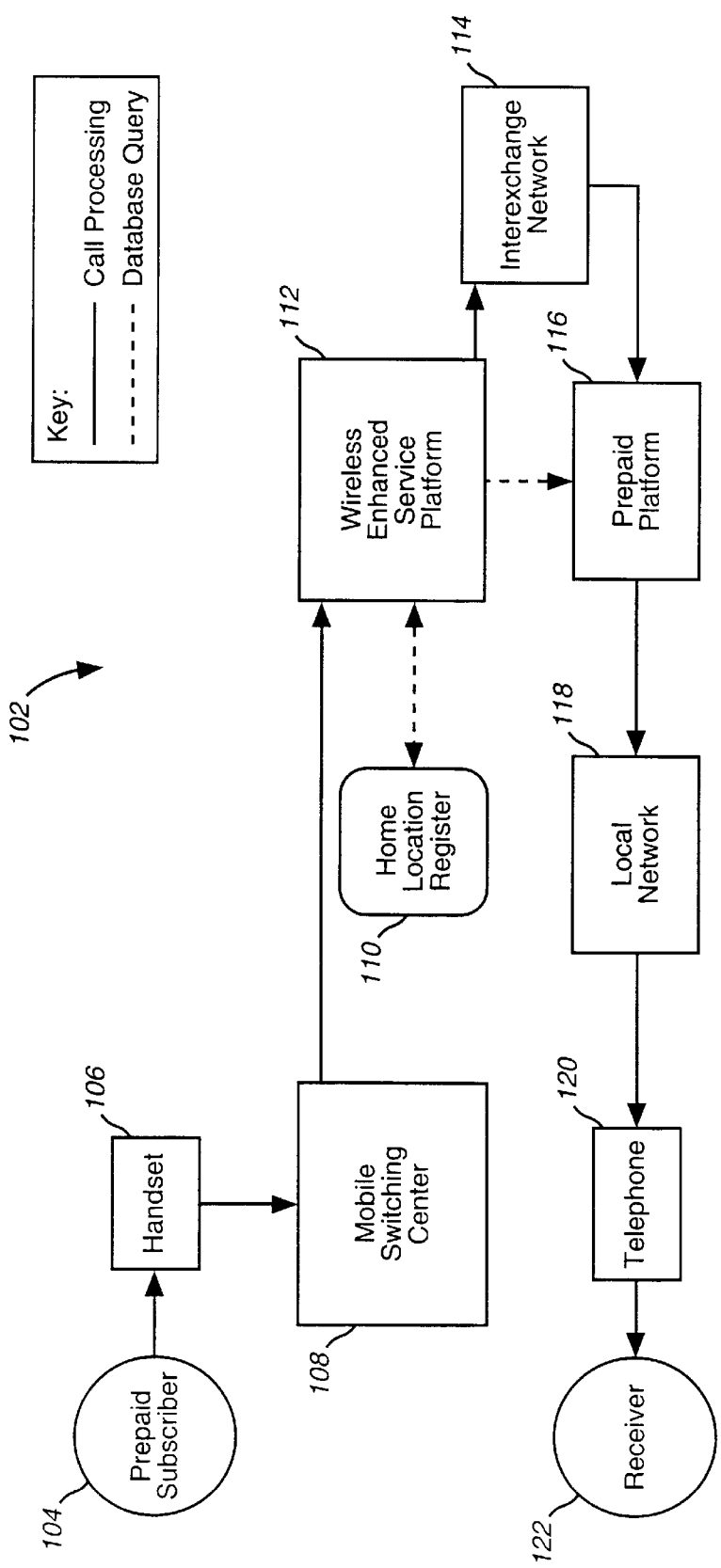
FIG. 1 is a block diagram of a prepaid wireless call origination environment according to a preferred embodiment of the present invention.

FIG. 1 is a block diagram of a debit or prepaid wireless call origination environment 102. The terms debit and prepaid are used synonymously herein. The prepaid wireless call origination environment 102 comprises a wireless enhanced service platform 112, a home location register 110, an interexchange network 114, and a prepaid platform 116.

In an originating wireless debit call, the caller is a wireless debit calling service subscriber 104 (also called a prepaid subscriber). The prepaid subscriber 104 places the call using a wireless handset 106 which is also referred to as a subscriber station, a wireless telephone, or a cellular telephone. When the prepaid subscriber 104 enters calling information (i.e., dials a telephone number) via the wireless handset 106, the wireless handset 106 signals to a mobile switching center 108. The mobile switching center 108 is a switch which routes calls and performs call handling functions. Multiple mobile switching centers 108 are spaced geographically apart. Each mobile switching center 108 has a corresponding database (not shown) containing subscriber information. The mobile switching center 108 accesses the database to gain information about the subscriber 104.

The mobile switching center 108 directs the call to the wireless enhanced service platform 112. The wireless enhanced service platform 112 comprises several components that accept wireless calls, provide audio capability when needed, collect billing information, and route the call through the telecommunications network. The wireless enhanced service platform 112 routes calls by accessing information in the home location register 110. The home location register 110 is a functional database containing subscriber profile and mobility management information. Embodiments of the wireless enhanced service platform 112 and the home location register 110 are described in U.S. patent application Ser. No. 08/445,997 filed Jun. 28, 1995 entitled, "Method and Apparatus for Improved Call Connectivity in an Intelligent Wireless Network," incorporated herein by reference in its entirety.

Wireless enhanced service platforms 112 typically do not include components that process and bill debit calls. In a network using the present invention, the components of the wireless enhanced service platform 112 need only limited modifications to route to components that store customer account information in the prepaid platform 116.

The wireless enhanced service platform 112 routes debit calls to the prepaid platform 116 using an initial address message and a transaction capabilities application part message. As discussed earlier, the format of both messages complies with the ANSI SS7 ISUP industry standard.

The prepaid platform 116 determines whether the subscriber 104 has sufficient funds in his or her account to connect the call. The prepaid platform 116 is made up of several components that-have switching, audio, prepaid information processing, and billing capabilities. The prepaid platform 116 determines whether to allow the call based on the funds in the subscriber's account and collects and processes the information needed to bill the call.

The calls may be routed to the prepaid platform 116 via an interexchange network 114. An interexchange network 114 comprises a plurality of switches or exchanges that are located throughout a geographic area. For example, a national interexchange network 114 would comprise switches located throughout the nation. When a call is routed to the interexchange network 114, it is routed to one or more switches within the interexchange network 114. The calls are routed via an interexchange network 114 because installing direct signaling links and telephone lines between the wireless enhanced service platform 112 and the prepaid platform 116 is prohibitively expensive.

The prepaid platform 116 completes the call via a local exchange network 118. A local exchange network 118 comprises switches and termination equipment within a localized area. An example of a local exchange network 118 is a local Bell operating company network such as Bell Atlantic. The local exchange network 118 terminates the call at a telephone 120 which if answered by the receiver 122, completes the call connection.

Figure 2:
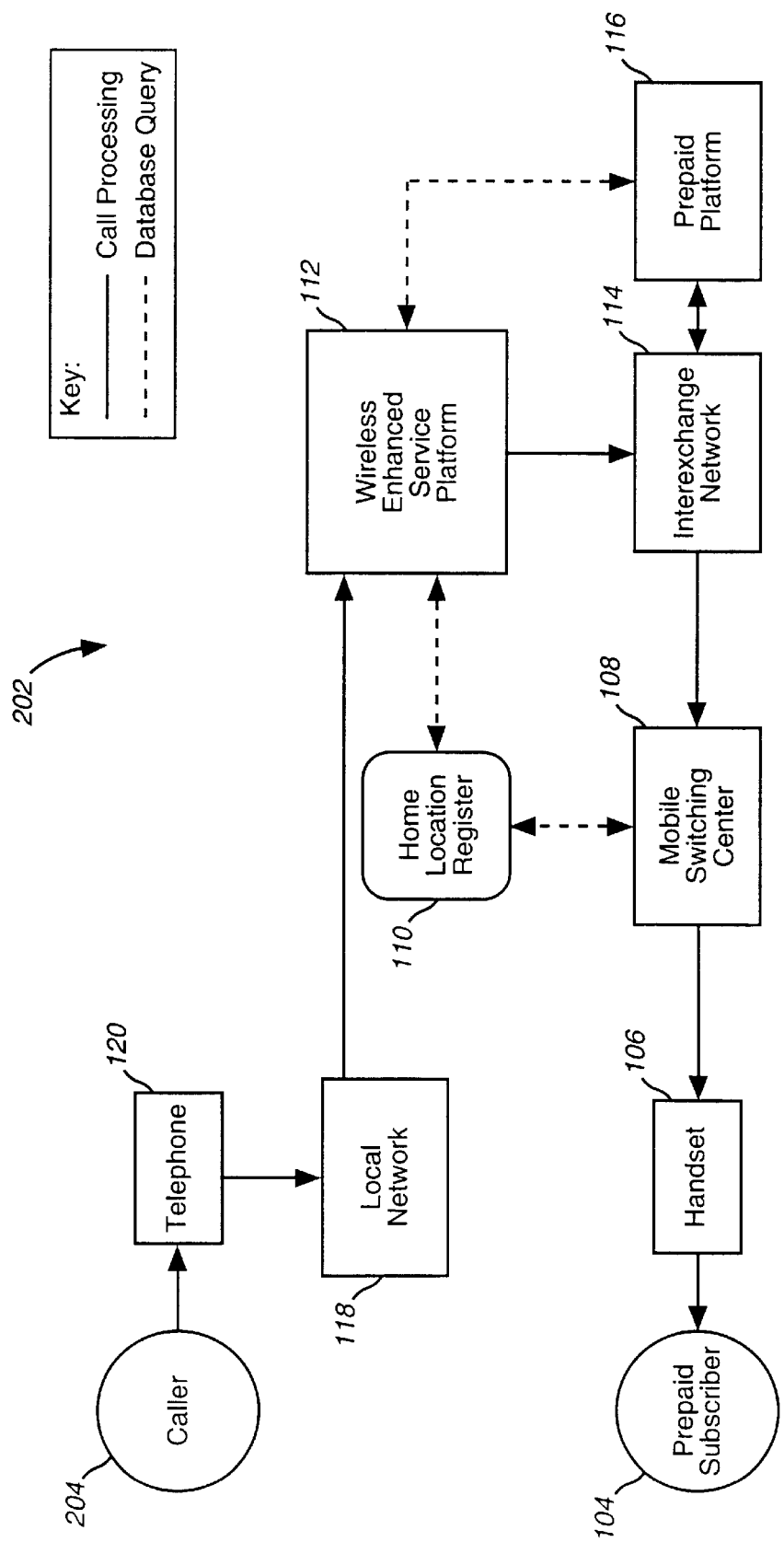
FIG. 2 is a block diagram of a prepaid wireless call termination environment according to a preferred embodiment of the present invention.

FIG. 2 is a block diagram of the prepaid wireless call termination environment 202. The prepaid wireless call termination environment 202 comprises the same network components as the origination environment 102, specifically, a wireless enhanced service platform 112, a home location register 110, an interexchange network 114, and a prepaid platform 116.

In a prepaid wireless terminating call, the called party is a wireless debit calling service subscriber 104. Unlike non-wireless service, a wireless subscriber 104 is billed not only for making a call, but also for receiving a call. The caller 204 may be any telephone service customer, however; in this embodiment the caller 204 uses a non-wireless service.

When the caller 204 enters calling information (i.e., dials a telephone number) via the telephone 120, the telephone 1.20 signals to the local exchange network 118. Contrary to originating call processing, the local exchange network 118 and not the mobile switching center 108. accepts the call from caller 204 and sets up the call to the wireless enhanced service platform 112.

Nevertheless, the wireless enhanced service platform 112 accepts the call and uses information obtained by querying the home location register 110 to process the call. Similar to originating call processing, the wireless enhanced service platform 112 needs only limited modifications to handle debit calling service. The wireless enhanced service platform 112 routes calls to the prepaid platform 116 via the interexchange network 114 for prepaid call processing. Also, similar to originating call processing, the wireless enhanced service platform 112 routes the calls to the prepaid platform 116 using an initial address message and a transactional capabilities application part message.

Like originating call processing the prepaid platform 116 can terminate a call to a wireless subscriber 104 via the local exchange network 118 if the local exchange network 118 is capable of handling wireless calls. However, if the local exchange network is not capable of handling wireless calls, the terminating calls are routed from the prepaid platform 116 back to the interexchange network 114 as is shown in FIG. 2. The interexchange network 114 routes the call to the mobile switching center 108 that serves the prepaid subscriber 104.

When the mobile switching center 108 receives the call, the mobile switching center 108 signals to the wireless handset 106 of the prepaid subscriber 104. Like originating call processing, the call connection is complete if the prepaid subscriber 104 answers the call.

Operation of the Invention

Figure 3A:
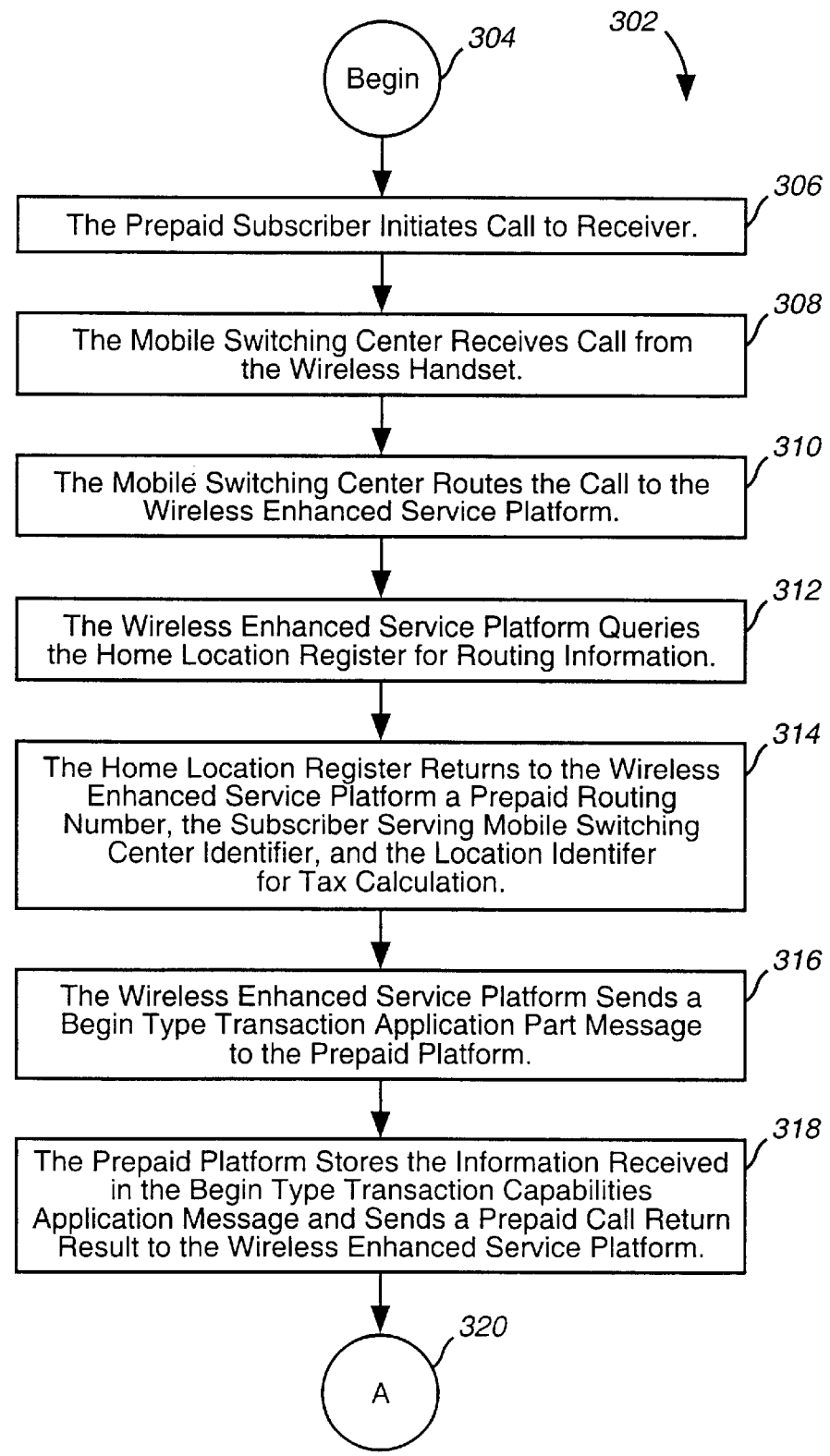
FIGS. 3A and 3B collectively depict a flowchart illustrating the operation of the prepaid wireless call origination environment of FIG. 1 according to a preferred embodiment of the present invention.
Figure 3B:
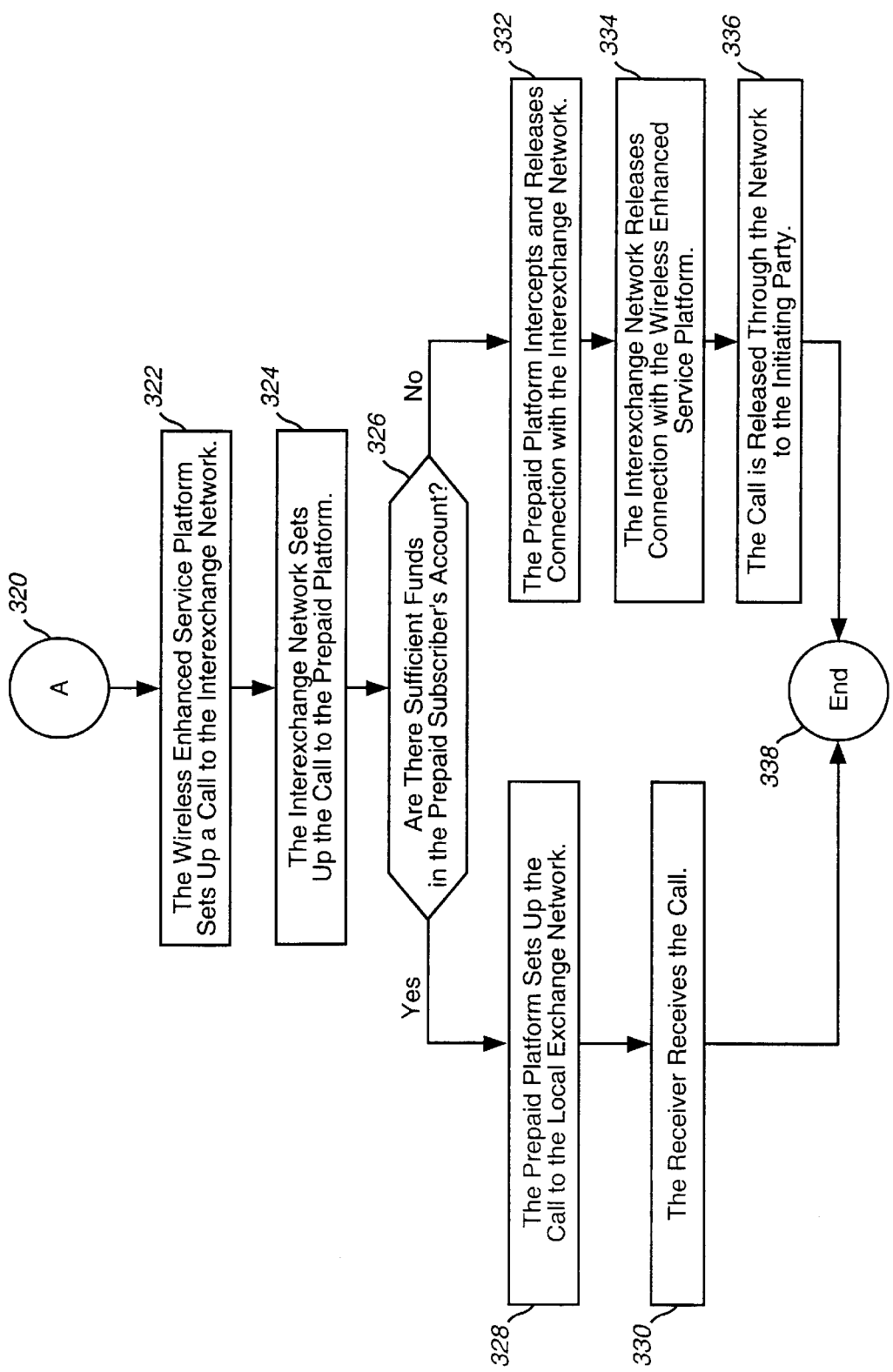

FIGS. 3A and 3B collectively represent a flowchart 302 which illustrates the operation of the prepaid wireless call origination environment 102. When describing the steps of FIGS. 3A and 3B, the components shown in FIG. 1 will be referenced. In step 306, the prepaid subscriber 104 initiates a call to a receiver 122. The prepaid subscriber 104 does this by entering digits of a telephone number in the wireless handset 106.

In step 308, the mobile switching center 108 receives the call. The digits entered into the wireless handset 106 are transferred via a signal to the mobile switching center 108 in a well known manner.

In step 310, the mobile switching center 108 routes the call to the wireless enhanced service platform 112. The mobile switching center 108 sends an origination request to the wireless enhanced service platform 112. The origination request consists of an initial address message. The initial address message is used when a component in a telecommunications network signals to another component to set up a call.

The preferred initial address message contains fields that describe the nature of the connection, the calling party, the called party, and other attributes needed to connect and bill a call. For example, the calling party number and called party number fields give routing and billing information The charge number field gives billing information. Also included are fields that indicate the attributes of the network the call is being carried on. For example, the nature of the connection indicators inform the receiving equipment whether satellite and echo suppression equipment are being used. A fill list of the fields of the initial address message is given in Table 1 below.

TABLE 1

Initial Address Message

| Fields | Usage |
| --- | --- |
| Nature of Connection Indicators | Set of indicators regarding the transmission of connectivity. |
| Forward Call Indicator | Set of indicators regarding the connection and type of call. |
| Calling Number Party | Ordinary Calling Subscriber (ISDN) numbering plan. |
| User Service Information | Set of indicators identifying the bearer capability information. |
| Charge Number | Mobile subscriber's billing number if different from the mobile subscriber's directory number. |
| Calling Party Number | Mobile subscriber's directory number. |
| Called Party Number | Destination address digits. |
| Redirecting Number Parameter | The last forwarding number, if call forwarding has occurred. The presence of this parameter depends on the availability of this information from the originating network. |
| Original Called Number | Original destination address digits dialed, if multiple call forwarding has occurred. The presence of this parameter depends on the availability of this information from the originating network. |
| Originating Line Information | Originating lines ANI information digits. |
| Transit Network Selection | Information regarding transit networks. |
| Generic Address Field | Optional |
| Super Generic Digits Field | Optional |
| Network Transport | Optional |

In step 312, the wireless enhanced service platform 112 queries the home location register 110 for routing information. The home location register 110 maintains two types of subscriber information: subscription information and location information. Subscription information is the services that the subscriber 104 is authorized to use. The home location register uses the subscription information to verify that the subscriber 104 is authorized for prepaid wireless service. One type of location information is the last mobile switching center 108 that was registered as serving the subscriber 104. This is stored in the form of a mobile switching center identification number which identifies the appropriate mobile switching center. Other location information is used to calculate tax on the cost of a call. In addition, the subscriber is identified using a mobile identification number. Location information is used properly route and bill the call.

In step 314, the home location register 110 returns to the wireless enhanced service platform 112 a prepaid routing number, the subscriber's mobile switching center identification number, and the location identifier for tax calculation. The prepaid routing number may be a national number, such as the ten-digit number used to route and bill dial-1 calls, or a switch and trunk identifier. Switch and trunk identifiers are used by the switches in telecommunications networks to route calls to another switch via a specified trunk. A trunk is a group of traffic links that have the same physical endpoints and are defined in the switch software to be used as one entity for routing calls.

In step 316, the wireless enhanced service platform 112 sends a transaction capabilities application part message to the prepaid platform 116 to transfer information needed to process and bill the prepaid wireless call. As mentioned previously, the transaction capabilities application part message is specified by the American National Standards Institute (ANSI) Signaling System Number 7 (SS7) Integrated Services Digital Network (ISDN) User Part (ISUP) standard. The three types of transaction capabilities application part messages are begin, end, and unidirectional. A begin type transaction capabilities application part message begins a transaction and needs a response. An end type transaction capabilities application part message is a response to a begin message. A unidirectional message is a message that does not require a response and is not a response.

The wireless enhanced service platform 112 sends a begin type of transaction capabilities part message to the prepaid platform 116. Message type, whether begin, end, or unidirectional, is specified in the transaction portion of the transaction capabilities application part message. The portions of the transaction capabilities application part message are shown in Table 2 below.

TABLE 2

Transaction Capabilities Application Part Message

| Field | Usage |
| --- | --- |
| Transaction Portion | Indicates the type of message and the network elements that will receive the message. |
| Component Portion | Indicates the operation to be performed, provides billing and routing information, and provides a response to the message transfer. |

More particularly, the message type is specified by the message type tag field in the transaction portion of the transaction capabilities application part message. The transaction portion also contains a transaction identifier which identifies particular transaction capabilities application part messages and allows association of begin and end messages. The type of transaction identifier varies based on the type of message. Further description of the transaction portion of the transaction capabilities application part message is given in Table 3 below. In Table 4 below, additional information is given concerning the message type tag and transaction identifier.

TABLE 3

Transaction Portion of the Transaction Capabilities Application Part Message

| Field | Usage |
| --- | --- |
| Message Type Tag | Indicates the type of transaction. The three types are begin, end, and unidirectional. |
| Total TCAP Message Length | Indicates the total length of the TCAP message. |
| Transaction Portion Information Element | Comprises a transaction identifier and transaction identifier length. A transaction identifier permits transaction association. A transaction identifier length indicates the total length of the transaction identifier. |

TABLE 3-continued

Transaction Portion of the Transaction Capabilities Application Part Message

| Field | Usage |
| --- | --- |
| Component Portion Tag | Indicates that the component portion of the TCAP message follows. |
| Component Portion Length | Indicates the total length of the component sequence. |

TABLE 4

Message Type Definition and Association with Transaction Identifier

| Message Type Tag | Use of Message Type Tag | Transaction Identifier |
| --- | --- | --- |
| Begin | Indicates the beginning of a transaction and the need to return a response. | An originating transaction identifier is included in the message. |
| End | Indicates the response to a query and an end to the transaction. | A destination transaction identifier is included in the message. |
| Uni-directional | Indicates a message does not require a response. | No transaction identifier is included in the message. |

In addition to having different transaction identifiers, the component portion used varies based on message type. A begin type transaction capabilities application part message uses a query (also referred to as an invoke) component. Provided below in Table 5 is further detail on two types of component portions of the transaction capabilities application part message.

TABLE 5

Component Portion of the Transaction Capabilities Application Part Message

| Field | Usage |
| --- | --- |
| Query/Invoke Component | Indicates the operation to be performed and provides routing and billing information. |
| Response Component | Includes three components which, depending on the component, indicate whether the message was successful, in error, or rejected. |

The wireless enhanced service platform 112 sends the transaction capabilities application part message to the prepaid platform 116 in order to transfer prepaid routing and billing information. This information is transferred in the component portion of the transaction capabilities application portion of the message. The parameter contents field in the query/invoke component can contain multiple parameters that are defined on a product-by-product basis. More information about the query or invoke message type is in Table 6 below.

TABLE 6

Query or Invoke Component

| Field | Usage |
| --- | --- |
| Component Type Tag | Indicates the type of component. |
| Invoke Identifier | Invoke identifiers are used to distinguish between multiple components within a single transaction. The invoke identifier is preceded by an invoke identifier tag and an invoke identifier length. |

TABLE 6-continued

Query or Invoke Component

| Field | Usage |
|---|---|
| Operation Code | Identifies the operation to be performed. The operation code is preceded by an operation code tag and an operation code length. |
| Linked Identifier Tag | Identifies links. |
| Parameter Contents | Parameters defined on a product-by-product basis. Parameter contents are preceded by the parameter tag and parameter length. |

The prepaid routing and billing information transferred between the wireless enhanced service platform 112 and the prepaid platform 116 is referred to in the present invention as prepaid parameters. The prepaid parameters are transferred in the parameters contents field of the query or invoke component of the transaction capabilities application part message. The parameters contents field described briefly in Table 6 is defined in more detail in Table 7 below.

TABLE 7

Parameter Contents Field

| Field | Usage |
|---|---|
| Type of Digits | Refers to a calling number or billing number. |
| Nature of Number | Indicates whether a number is national or international. |
| Encoding Scheme | Indicates the format of the data, i.e., ASCII, BCD, etc. |
| Number of Digits | Indicates the number of digits in the actual data field. |
| Actual Data Field | Parameters in the actual data field may include but are not limited to primary account number, personal identification number, call originating administration identifier (which indicates the network the user is making the call from), called number, calling number, call disposition code, call start time, call duration, estimated call charge, error code, problem code, and response code. |

The prepaid parameters are the mobile identification number, the digits dialed by the caller, the mobile switching center identification number, and a location identifier for tax calculation. The prepaid parameters are used to bill the prepaid wireless call. The mobile identification number identifies the prepaid subscriber 104. The mobile identification number is used to signal to the wireless handset 106. The mobile switching center identification number, interchangeably herein referred to as the subscriber serving mobile switching center 108 identifier, identifies the prepaid subscriber's 104 serving mobile switching center. The mobile switching center identification number is used to determine the rating for billing of the call. This identifier is also used to establish where the call was placed. The dialed digits indicate where the call set-up will be completed. The location identifier for tax calculation is used in calculating the tax on the cost of the call. The prepaid parameters are shown in Table 8 below.

TABLE 8

Prepaid Contents Field

| Fields | Usage |
|---|---|
| MIN | Originating mobile identification number. |
| Digits | Dialed digits of the call being made by the prepaid subscriber. |

TABLE 8-continued

Prepaid Contents Field

| Fields | Usage |
|---|---|
| MSCID | Mobile Switching Center (MSC) Identifier (ID) of the serving MSC. This is used to determine the appropriate rating for billing of the call. |
| Location ID | Location information of the subscriber to be used to determine appropriate tax information for billing, if available. |

The prepaid routing number is stored in the called party number field of the initial address message. The called party number is a field in the initial address message shown in Table 1 above and in more detail in Table 9 below. The address information field of the called party number field typically contains the destination address digits. However, in this invention the address information field contains the prepaid routing number. More description of the called party number field is given in Table 9 below.

TABLE 9

Called Party Number Field

| Fields | Usage |
|---|---|
| Nature of Address Indicator | Indicates whether number dialed is a national number, international number, or switch identifier and trunk number. |
| Numbering Plan | Choice of unknown (default) or ISDN (telephony) numbering plan, based on the dialed digits. |
| Address Information | Address digits dialed by the calling party if any. |

In step 318, the prepaid platform 116 stores the prepaid parameters received in the begin type transaction capabilities application part message and sends an end type transaction capabilities application part message to the wireless enhanced service platform 112. The parameters in the end type transaction capabilities application part message comprise the mobile switching center identification number, a call identification number, and the result. The call identification number is a ten digit number that is used by the prepaid platform 116 in a later step to retrieve the stored information. The result, which is represented in the response component of the transaction capabilities application part message, may be return result, if the call can be successfully processed, rejected, if a parameter is missing, or error, indicating either an error in the information transmitted or a system problem that prohibits call set-up at that time. More detail about the response component is given in Table 10 below.

TABLE 10

Response Component

| Field | Usage |
|---|---|
| Return Result Last | Indicates that a transaction completed successfully. Includes a component type tag and an invoke identifier tag. May also include a sequence tag, an operation code tag, and a parameters field. A sequence tag is used when there is more than one parameter in a component. It is followed by sequence length. |

TABLE 10-continued

Response Component

| Field | Usage |
|---|---|
| Return Error Component | Indicates either that invalid information was transmitted or a system failure exists that prohibits call set-up. Includes a component type tag and an invoke identifier tag. May also include a parameters field. |
| Reject Component | Indicates a protocol error such as a missing parameter. Includes a component type tag, an invoke identifier tag, a problem code tag, and a parameter field. A problem code is preceded by a problem code tag and a problem code length. A problem code may be one of the four following types: a general problem, a return result problem, and a return error problem. |

In step 322, the wireless enhanced service platform 112 sets up a call to the interexchange network 114. The wireless enhanced service platform 112 sends an initial address message to a switch within the interexchange network 114 with the prepaid routing number in the called party number field and the call identification number in the charge number field. The switch within the interexchange network 114 may set up the call via other switches within the interexchange network 114 depending on the availability of traffic links.

In step 324, the interexchange network 114 sets up the call to the prepaid platform 116. The interexchange network 114 uses the prepaid routing number to set-up the call to the prepaid platform 116. If the prepaid routing number is a national number, the switch in the interexchange network 114 looks up the number in a table to retrieve from the table the corresponding switch that is on the prepaid platform 116 and trunk group that is used to route calls to that switch in the prepaid platform. The calls are then routed via the retrieved trunk group to the switch in the prepaid platform. If the prepaid routing number is a switch and trunk identifier, the calls are routed over the trunk group to the identified switch. The interexchange network 114 signals using an initial address message with the call identification number in the charge number field.

In step 326, the prepaid platform 116 determines whether the call should be allowed. To do this the prepaid platform 116 determines whether there are sufficient funds in the subscriber's account. The prepaid platform 116 uses the calling number to retrieve the subscriber's account information and the call identification number which is in the charge number field to retrieve the previously stored billing information. The prepaid platform 116 uses the prepaid parameters, specifically the mobile identification number, the digits dialed by the caller, the subscriber serving mobile switching center 108 identifier, and the location identifier for tax calculation, to determine the cost of setting up the call. The prepaid platform 116 compares the cost of setting up the call to the funds available in the subscriber's account to determine if there are sufficient funds to establish the call.

If there are sufficient funds, step 328 is performed. In step 328, the prepaid platform 116 sets up the call to the local exchange network 118.

In step 330, the receiver 122 receives the call via the telephone 120 and the call connection is complete. Operation of flowchart 302 is complete after step 330 is performed, as indicated by step 338.

Referring again to step 326, if the subscriber 104 does not have sufficient funds in his or her account, step 332 is performed. In step 332, the prepaid platform 116 intercepts the call. The prepaid platform 116 provides a message to the prepaid subscriber 104 informing him or her of the lack of funds in the account. Then the prepaid platform 116 releases the connection with the interexchange network 114.

In step 334, the interexchange network 114 releases the connection with the wireless enhanced service platform 112.

In step 336, the call is released through the network to the prepaid subscriber 104. Operation of flowchart 302 is complete after step 336 is performed, as indicated by step 338.

Figure 4A:
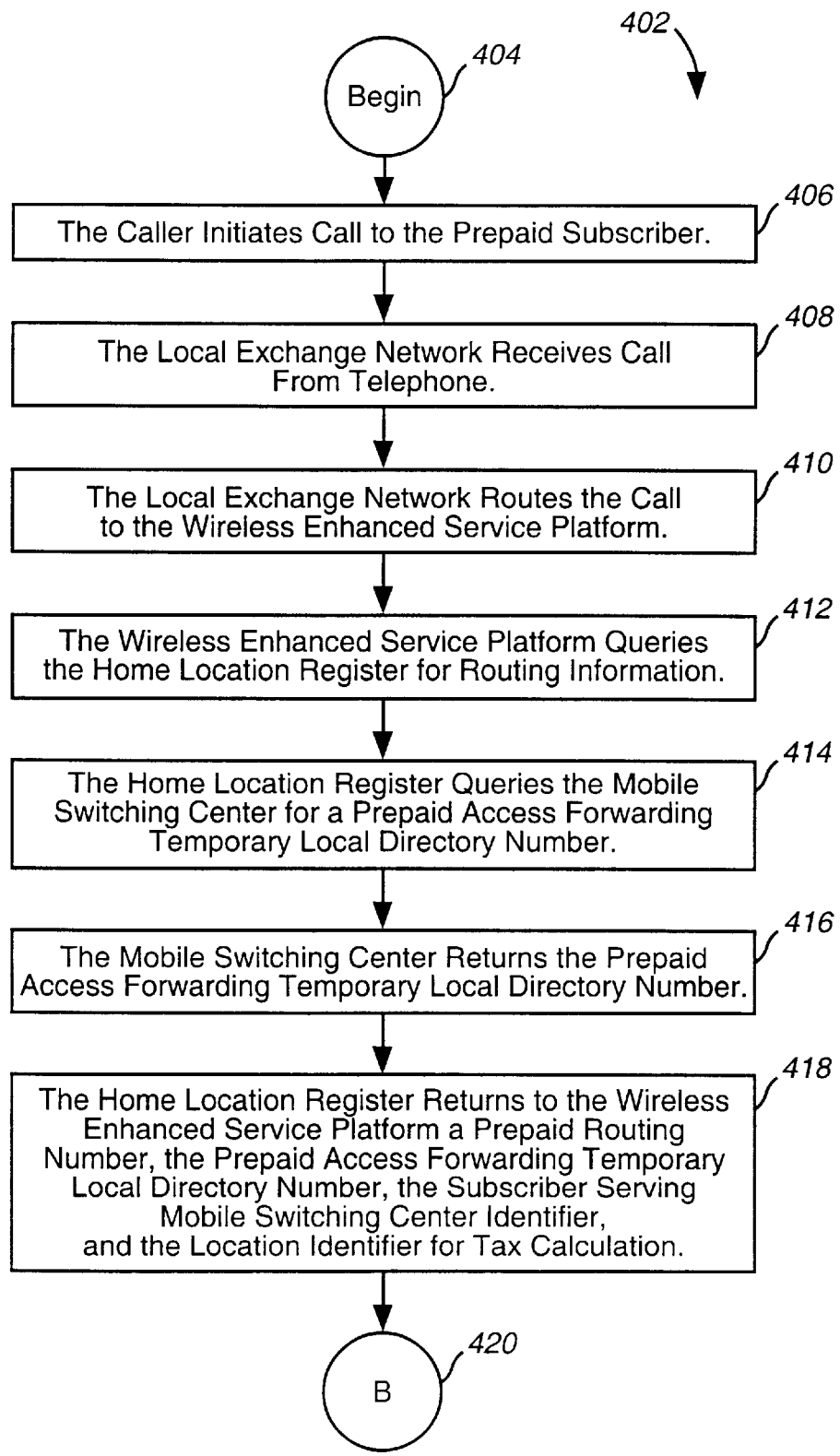
FIGS. 4A and 4B collectively depict a flowchart illustrating the operation of the prepaid wireless call termination environment of FIG. 2 according to a preferred embodiment of the present invention.
Figure 4B:
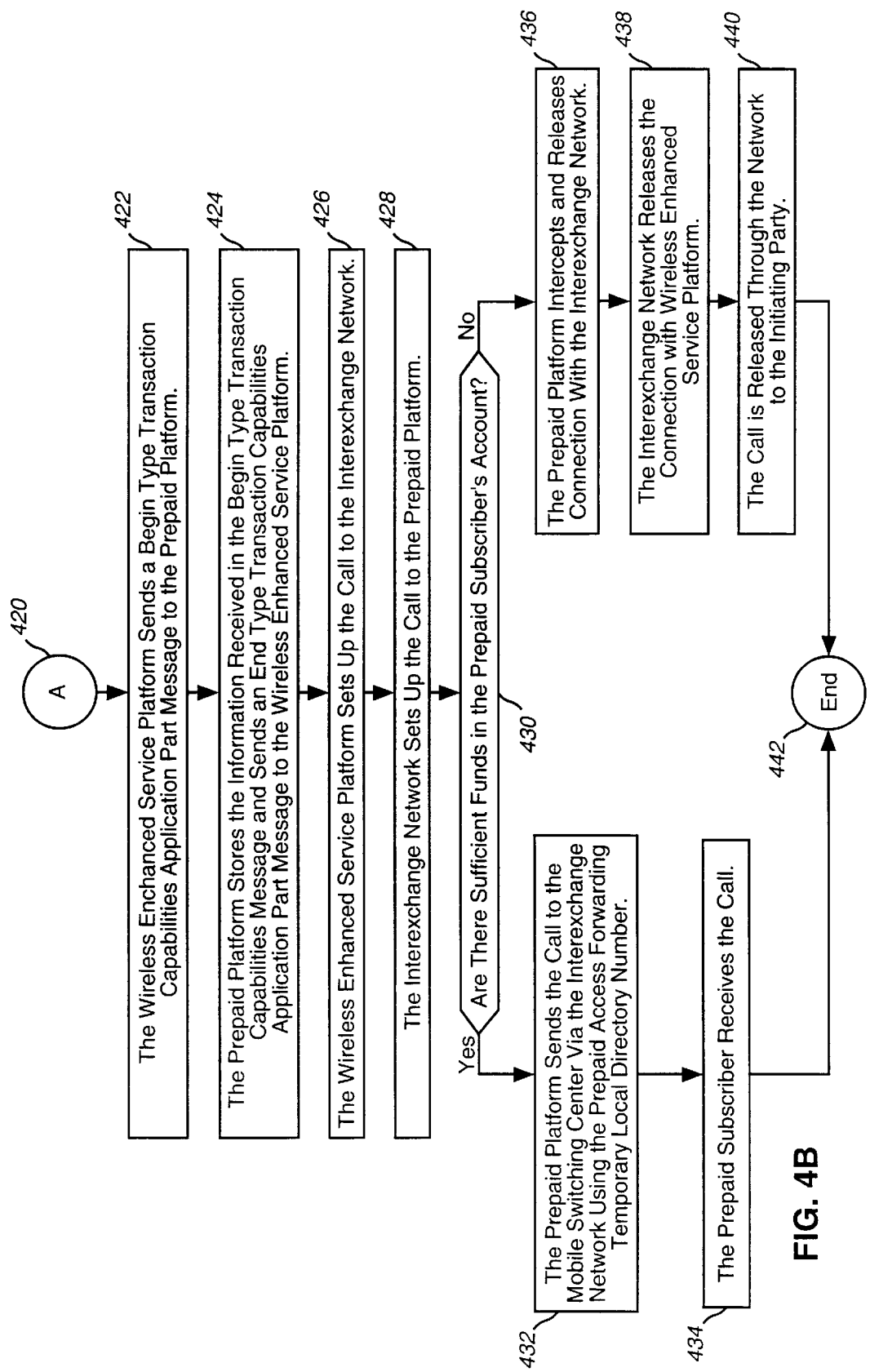

FIGS. 4A and 4B collectively represent flowchart 402 which illustrates the operation of the prepaid wireless call termination environment 202. When describing the steps of FIGS. 4A and 4B, the components shown in FIG. 2 will be referenced. In step 406, the caller 204 initiates a call to the prepaid subscriber 104. The caller 204 initiates the call by entering digits of a telephone number in the telephone 120.

In step 408, the local exchange network 118 receives a call from the telephone 120. The digits entered into the telephone 120 are transferred to the local exchange network 118 in a well known manner.

In step 410, the local exchange network 118 routes the call to the wireless enhanced service platform 112. The local exchange network 118 uses the same signaling as is used for other voice calls.

In step 412, the wireless enhanced service platform 112 queries the home location register 110 for routing information. As previously mentioned, the home location register 110 maintains two types of subscriber information: subscription information and location information. Subscription information is the services that the subscriber 104 is authorized to use. The home location register uses the subscription information to verify that the subscriber 104 is authorized for prepaid wireless service. Location information includes a mobile switching center identification number and a location identifier used to calculate tax on the cost of a call.

In step 414, the home location register 110 queries the mobile switching center 108 for a prepaid access forwarding temporary local directory number. The prepaid access forwarding temporary local directory number is an additional parameter for terminating calls used by the prepaid platform 116 in a later step to route the call to the appropriate mobile switching center 108 for call completion. The prepaid access forwarding temporary local directory number is in the form of destination digits. The home location register 110 uses the mobile switching center identification number it has stored to determine which mobile switching center 108 to query.

In step 416, the mobile switching center 108 returns the prepaid access forwarding temporary local directory number to the home location register 110.

In step 418, the home location register 110 returns to the wireless enhanced service platform 112 the prepaid routing number, the prepaid access forwarding temporary local directory number, the mobile switching center identification number, and the location identifier for tax calculation. Similar to prepaid wireless originating calls, the prepaid routing number may be a national number or a switch and trunk identifier.

In step 422, similar to originating calls, the wireless enhanced service platform 112 sends begin type transaction capabilities application part to the prepaid platform 116. Like originating calls, the begin type transaction capabilities application part message includes prepaid parameters. Also, similar to originating calls, the prepaid parameters are transmitted in the parameter contents field in the query/invoke component of the transaction capabilities application part message.

Two prepaid parameters, the mobile switching center identification number and a location identifier for calculating tax, are the same for both originating and terminating calls. However, for terminating prepaid wireless calls, prepaid parameters also comprise the prepaid access forwarding temporary local directory number and the terminating mobile identification number. The prepaid access forwarding temporary local directory number will be used in a later step by the prepaid platform 116 to route the call to the mobile switching center 108 for completion. The terminating mobile identification number is used to determine the wireless handset 106 that will receive the call. The prepaid parameters in the begin type transaction capabilities application part message are given in Table 11 below.

TABLE 11

Terminating Prepaid Parameters

| Fields | Usage |
| --- | --- |
| MIN | Called subscriber's mobile identification number. |
| PAF TLDN | This is the Prepaid Access Forwarding Temporary Local Directory Number that has been retrieved from the current Serving Mobile Switching Center for the subscriber. The Prepaid Processing Platform will use this TLDN when routing the call to the Serving Mobile Switching Center for completion. The TLDN is in the form of destination digits. |
| MSCID | Mobile Switching Center (MSC) Identified (ID) of the serving MSC. This is used to determine the appropriate rating for billing of the call. |
| Location ID | Location information of the subscriber to be used to determine appropriate tax information for billing, if available. |

In step 424, the prepaid platform 116 stores the prepaid parameters received in the begin type transaction capabilities application part message and sends an end type transaction capabilities application part message to the wireless enhanced service platform 112 Similar to originating calls, parameters in the end type transaction capabilities application part message comprise the mobile switching center identification number, a call identification number, and the result. Again, the call identification number is a ten digit number that is used by the prepaid platform 116 in a later step to retrieve the stored information. The possible results that may be returned are also similar to originating calls. The possible results that may be returned are successful, if the call can be processed, rejected, if a parameter is missing, or error, indicating either an error in the information transmitted or a system problem that prohibits call set-up at that time.

In step 426, the wireless enhanced service platform 112 sets up the call to the interexchange network 114. Similar to originating calls, the interexchange network 114 obtains a switch and trunk identifier using the prepaid routing number and sets up the call via the trunk group to the identified switch within the prepaid platform 116. The wireless enhanced service platform 112 sends an initial address message with the prepaid routing number in the called party number field and the call identification number in the charge number field.

In step 428, the interexchange network 114 sets up the call to the prepaid platform 116. The interexchange network 114 sends an initial address message with the call identification number in the charge number field to the prepaid platform 116.

In step 430, the prepaid platform 116 determines whether the call should be allowed. The prepaid platform 116 determines whether there are sufficient funds in the prepaid subscriber's account. The prepaid platform 116 uses the called number to retrieve the subscriber's account information and the call identification number which is in the charge number field to retrieve the previously stored billing information. The prepaid platform 116 uses the prepaid parameters, specifically the terminating mobile identification number, the digits dialed by the caller, the subscriber serving mobile switching center identification number, and the location identifier for tax calculation, to determine the cost of setting up the call. The prepaid platform 116 compares the cost of setting up the call to the funds available in the subscriber's account to determine if there are sufficient funds to establish the call.

If there are sufficient funds, step 432 is performed. In step 432, the prepaid platform 116 sends the call to the mobile switching center 108 via the interexchange network 114 using the prepaid access forwarding temporary local directory number. The prepaid access forwarding temporary local directory number, in the form of destination digits, is used by the switch in the interexchange network 114 to route the call to the appropriate mobile switching center 108. The switch in the interexchange network 114 looks up in a table the switch and trunk identifiers corresponding to the prepaid access forwarding temporary local directory number. The switch and trunk identifiers identify a mobile switching center 108 and a trunk group to the mobile switching center 108. The switch in the interexchange network 114 routes the call to the identified mobile switching center 108 via the retrieved trunk group.

In step 434, the prepaid subscriber 104 receives the call via the telephone 120 and the call connection is complete. Operation of flowchart 402 is complete after step 434 is performed, as indicated by step 440.

If there are not sufficient funds, step 436 is performed. In step 436, the prepaid platform 116 intercepts and releases connection with the interexchange network 114.

In step 438, the interexchange network 114 releases connection with the wireless enhanced service platform 112.

In step 440, the call is released through the network to the caller 204. Operation of flowchart 402 is complete after step 440 is performed, as indicated by step 442.

Other embodiments of the present invention are possible. As mentioned above, another embodiment of the invention allows both the caller 204 and the receiver 104 of FIG. 2 to be wireless subscribers. Also, either or both may be prepaid subscribers. Referring to FIG. 2, this embodiment comprises two handsets 106 rather than a wireless handset 106 and a telephone 120 and two mobile switching centers 108 rather than a mobile switching center 108 and a local exchange network 118.

Further embodiments are possible such as embodiments that replace the wireless handset 106 and/or telephone 120 of FIGS. 1 and 2 with other user interface equipment such as a computer terminal. The user interface equipment may be wireless or non-wireless.

Additional embodiments are possible that access and terminate the call using means other than a single mobile switching center 108 and a single local exchange network 118 shown in FIGS. 1 and 2. These embodiments may include a plurality of either mobile switching centers 108 and/or local exchange networks 118. Other embodiments may use different types of equipment, such as a private branch exchange, to perform the functions of the mobile switching center 108 and/or the local exchange network 118. A private branch exchange is an exchange that is owned by a private company and is not part of a public network. In another embodiment, the wireless enhanced service platform 112 performs the functions of the mobile switching center 108. Two additional embodiments that are possible comprise direct lines from the user interface equipment into the wireless enhanced service platform 112 or the prepaid platform 116. In these embodiments, the prepaid wireless call environment, including the wireless enhanced service platform 112, home location register 110, interexchange network 114, and the prepaid platform 116, perform the functions of the mobile switching center 108 and the local exchange network 118.

Still more embodiments are possible by reconfiguring the components of the prepaid wireless call environment. For example, referencing FIG. 1 or 2, an alternative embodiment does not include the interexchange network 114. In FIG. 1, the interexchange network 114 can be omitted by installing lines directly between the wireless enhanced service platform 112 and the prepaid platform 116. In FIG. 2, the interexchange network 114 can be omitted by both installing lines directly between the wireless enhanced service platform 112 and the prepaid platform 116 and installing lines directly from the prepaid platform 116 to the mobile switching center 108 or another piece of equipment performing the mobile switching center's function. Furthermore, the home location register 110 may be omitted and its function may be performed by the wireless enhanced service platform 112. Finally, the wireless enhanced service platform 112 and the prepaid platform 116 may be combined into the same platform or component with the signaling of the present invention occurring between the wireless and prepaid functional environments.

While various embodiments of the present invention have been described above, it should be understood that they have been presented by way of example only, not limitation. Thus, the breadth and scope of the present invention should not be limited by any of the above-described exemplary embodiments, but should be defined only in accordance with the following claims and their equivalents

What is claimed is:

1. A method of setting up a call, comprising:

(1) sending a plurality of transaction capabilities application part messages between a wireless enhanced service platform and a paid platform, comprising the steps of:
        (i) sending a begin type transaction capabilities application part message including one or more prepaid parameters in a query or invoke component of the begin type transaction capabilities application part message from the wireless enhanced service platform to the prepaid platform; and
        (ii) sending an end type transaction capabilities application part message from the prepaid platform to the wireless enhanced service platform; and
    (2) sending an initial address message from the wireless enhanced service platform to the prepaid platform.

2. The method of claim 1, wherein the prepaid parameters comprise:
    a mobile switching center identification number.

3. The method of claim 1, wherein the prepaid parameters comprise:
    a number dialed by a caller; and
    a mobile switching center identification number.

4. The method of claim 1, wherein the prepaid parameters comprise:
    a prepaid access forwarding temporary local directory number; and
    a mobile switching center identification number.

5. The method of claim 1, wherein the end type transaction capabilities application part message comprises:
    a response component comprising:
        a call identification number; and
        a result.

6. The method of claim 1, wherein the end type transaction capabilities application part message comprises:
    a response component comprising:
        a mobile switching center identification number; and
        a result.

7. The method of claim 1 wherein step (2) comprises:
    (i) storing by the wireless enhanced service platform a prepaid routing number in a called party number field of the initial address message;
    (ii) sending the initial address message with the prepaid routing number stored from the wireless enhanced service platform to an interexchange network;
    (iii) retrieving the prepaid routing number from the called party number field and translating the prepaid routing number in order to route the call to the prepaid platform; and
    (iv) sending the initial address message from the interexchange network to the prepaid platform.

8. The method of claim 7 wherein the prepaid routing number comprises:
    a national routing number; or
    a switch identifier and a trunk identifier.

9. The method of claim 1 further comprising the following steps that are performed before step (1):
    sending a query for one or more prepaid parameters from a wireless enhanced service platform to a home location register; and
    sending one or more prepaid parameters from the home location register to the wireless enhanced service platform.

10. The method of claim 9 wherein said prepaid parameters comprise:
    a mobile identification number.

11. The method of claim 1 further comprising the following steps that are performed before step (1):
    signaling from a handset to a mobile switching center; and
    signaling from the mobile switching center to a wireless enhanced service platform.

12. The method of claim 1 further comprising the following steps:
    (3) signaling from the prepaid platform to a local network; and
    (4) signaling from the local network to a telephone.

13. The method of claim 1 further comprising the following steps that are performed before step (1):
    signaling from a telephone to a local network;
    signaling from the local network to a wireless enhanced service platform;
    sending a query for one or more prepaid parameters from the wireless enhanced service platform to a home location register;
    sending a query for a prepaid access forwarding temporary local directory number from the home location register to a mobile switching center;
    sending the prepaid access forwarding temporary local directory number from the mobile switching center to the home location register; and
    sending the prepaid parameters, including the prepaid access forwarding temporary local directory number, from the home location register to the wireless enhanced service platform.

14. The method of claim 1 further comprising the following steps:
  (3) signaling from the prepaid platform to an interexchange network;
  (4) signaling from the interexchange network to a mobile switching center; and
  (5) signaling from the mobile switching center to a wireless handset.

15. The method of claim 1 further comprising the following steps:
  (3) retrieving information from a subscriber's account within the prepaid platform; and
  (4) determining by the prepaid platform whether sufficient funds are in the subscriber's account to allow the call.

16. A method of setting up a call, comprising:
  (1) sending a plurality of transaction capabilities application part messages between a mobile switching center and a prepaid platform, comprising the steps of:
    (i) sending a begin type transaction capabilities application part message including one or more prepaid parameters in a query or invoke component of the begin type transaction capabilities application part message from the mobile switching center to the prepaid platform; and
    (ii) sending an end type transaction capabilities application part message from the prepaid platform to the mobile switching center; and
  (2) sending an initial address message from the mobile switching center to the prepaid platform.

17. The method of claim 16 further comprising the following steps that are performed before step (1):
  signaling from a telephone to a local network;
  signaling from the local network to a mobile switching center;
  sending a query for one or more prepaid parameters from the mobile switching center to a home location register; and
  sending the prepaid parameters from the home location register to the mobile switching center.

* * * * *

UNITED STATES PATENT AND TRADEMARK OFFICE
CERTIFICATE OF CORRECTION

PATENT NO.     : 6,453,158 B2
DATED          : September 17, 2002
INVENTOR(S)    : Donovan et al.

It is certified that error appears in the above-identified patent and that said Letters Patent is hereby corrected as shown below:

Title page,
Item [75], Inventors "McMurry" should read -- Angerer--.

Signed and Sealed this

Seventeenth Day of December, 2002

JAMES E. ROGAN
*Director of the United States Patent and Trademark Office*